(12) United States Patent
Frey

(10) Patent No.: US 7,279,889 B1
(45) Date of Patent: Oct. 9, 2007

(54) SYSTEM AND METHOD FOR CALIBRATION OF WELL LOGGING TOOLS

(75) Inventor: Mark T. Frey, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 12 days.

(21) Appl. No.: 11/394,720

(22) Filed: Mar. 31, 2006

(51) Int. Cl.
*G01V 3/18* (2006.01)

(52) U.S. Cl. .................... 324/202; 324/339

(58) Field of Classification Search ........ 324/202, 324/337, 338, 339, 345, 346
See application file for complete search history.

(56) References Cited

U.S. PATENT DOCUMENTS

| | | | |
|---|---|---|---|
| 4,800,496 A | | 1/1989 | Barber et al. |
| 5,467,019 A | * | 11/1995 | Lester et al. ............ 324/339 |
| 5,708,203 A | * | 1/1998 | McKinley et al. ....... 73/152.14 |
| 6,856,255 B2 | * | 2/2005 | Chalitsios et al. ....... 340/854.4 |

OTHER PUBLICATIONS

B. Clark et al., "Electromagnetic Propagation Logging while Drilling: Theory and Experiment," SPE Formation Evaluation, pp. 263-271 (Sep. 1990).

* cited by examiner

*Primary Examiner*—Jay M Patidar
(74) *Attorney, Agent, or Firm*—Bryan L. White; Kevin P. McEnaney; Brigitte L. Echols

(57) ABSTRACT

By breaking the calibration into two parts—one calibration offset being associated with a first portion, and the other calibration offset being associated with a second portion, it is possible to combine the various calibration offsets for a particular first portion mated with a particular second portion. Thus, any one of a number of downhole first portions can be combined, on a session-by-session basis, with any number of second portions. In one embodiment, the second portion calibration is specific to the particular second portion, and in another embodiment the calibration for a second portion is a fixed calibration offset that is based on a second portion type, such as the second portion size.

25 Claims, 5 Drawing Sheets

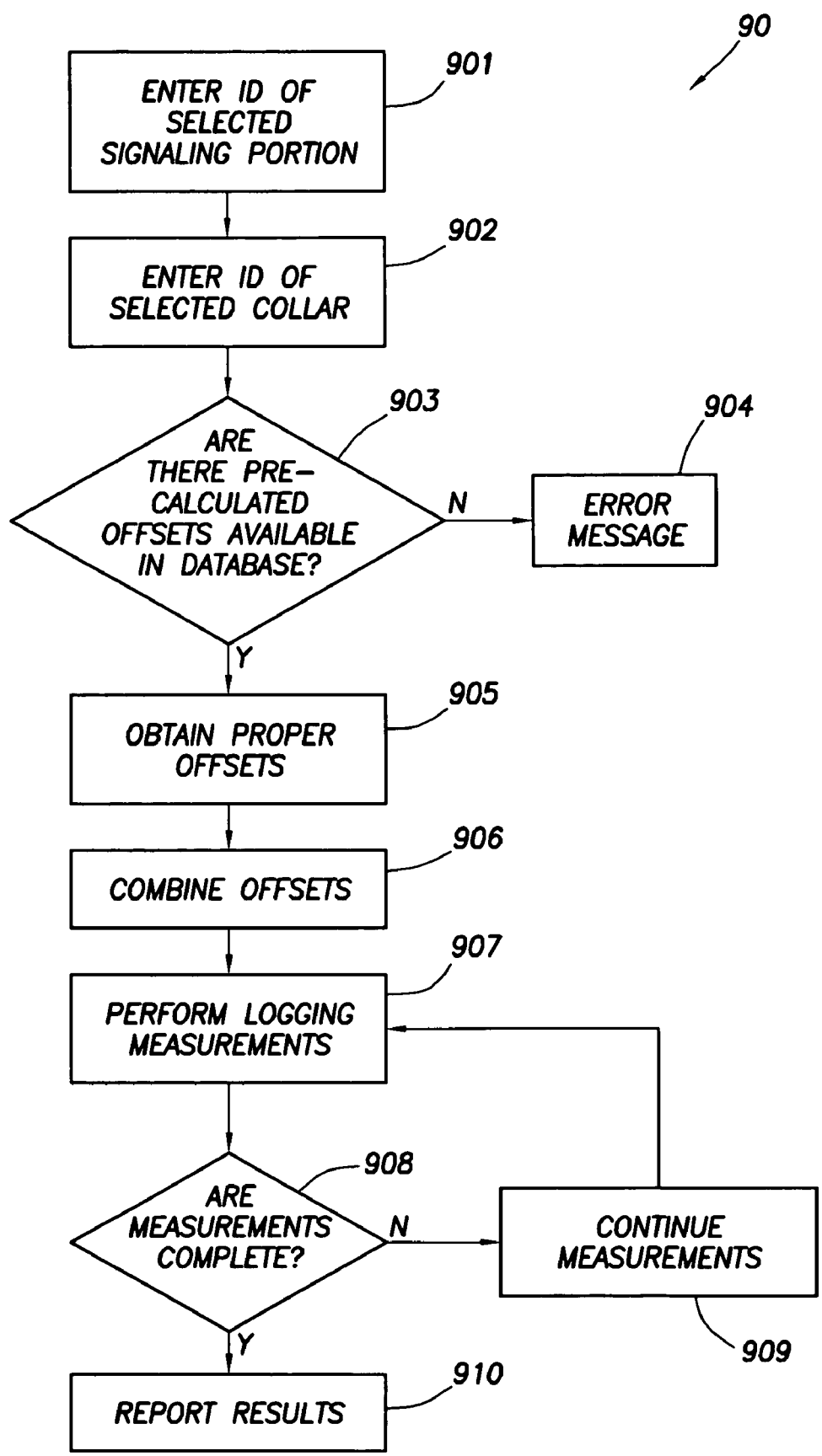

SYSTEM AND METHOD FOR CALIBRATION OF WELL LOGGING TOOLS

TECHNICAL FIELD

This invention relates to well logging tools, and more particularly to systems and methods for calibration of such tools.

BACKGROUND OF THE INVENTION

Well logging tools are well-known in the oilfield services industry. For example, propagation resistivity tools are used for resistivity logging downhole. It is well known that propagation resistivity tools require an offset calibration, usually called 'air calibration'. The offset phase shift and attenuation depend on details of the tool construction and tool-to-tool variation. Those details may include, for example, machine tolerances in antenna grooves, shields types, variations in antenna and antenna shield positions, and collar diameters.

A typical method for determining the air calibration of a standard propagation resistivity tool is to suspend the tool in air far from conductive material such that the measured phase shift and attenuation is affected only by the tool body and is not affected by the environment. The results of this calibration are subtracted from the phase shift and attenuation log measurements before they are transformed into resistivities.

Retrievable propagation resistivity tools are made of two parts, namely a signaling portion having transmitter and receiver antennas constructed on a mandrel, and a tubular, such as a drill collar, into which the mandrel is inserted. For ease of discussion, "drill collar" will be used to mean the drill collar, tubular, or housing into which the mandrel may be removeably disposed. In any measurement sequence it is critical to know the "errors" that are caused by the signaling portion of the tool as well as those introduced by the structure around the signaling portion (e.g., the drill collar). Compounding the problem for retrievable tools, unlike standard tools, it is often desired to use individual signaling portions with different drill collars.

One method for calibrating signaling portions and drill collars is to perform calibration tests on various combinations of signaling portions and drill collars matched together as pairs. This is time consuming as well as costly. In actual practice such pairing is difficult to manage as signaling portions and drill collars can be moved from location to location independently. Thus, it is important to have a method to allow any signaling portion to be used with any drill collar without performing pre-calculations on that particular signaling portion/drill collar combination.

BRIEF SUMMARY OF THE INVENTION

The offset calibration of a well logging tool can be broken into two parts. For example, it is possible to make one calibration offset associated with a first portion of the tool, and another calibration offset associated with a second portion. It is then possible to combine the two calibration offsets for a particular first portion mated with a particular second portion. Thus, any one of a number of first portions can be combined, on a session-by-session basis, with a particular second portion. In one embodiment, the second portion calibration is specific to the particular second portion, and in another embodiment the calibration for a second portion can be a fixed calibration offset that is based on a particular second portion design.

Thus, there is shown a method of calibrating, for example, retrievable resistivity tools made up from a plurality of different signaling portions operating in mated relationship with a plurality of different drill collars. The method determines individual calibration offsets for each of the signaling portions and drill collars so as to establish a total calibration offset for a particular combination of signaling portions and drill collars.

In another embodiment there is shown, as an example, a system for determining calibration of a retrievable resistivity tool in which the tool has any one of a number of different signaling units operating in mated relationship with any one of a number of different drill collars. The system comprises an application program for controlling the storage in a storage medium of offset calibration data pertaining to individual signaling units. The application program is further operable for controlling the storage on a storage medium of offset calibration data pertaining to at least a group of drill collars, the group having pre-determined, like characteristics. Additionally, the application program is further operable for accepting from a user an identification of a particular signaling unit and a particular drill collar and for thereupon calculating a combined offset for facilitating measurements using the particular signaling unit mated with the particular drill collar.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures for carrying out the same purposes as the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 9 one embodiment of a portion of a program for controlling the logging measurements.

DETAILED DESCRIPTION OF THE INVENTION

Many well logging tools are comprised of two major components. This is particularly true for retrievable tools, but is also true for tools that have an outer sleeve. The present invention thus applies to and includes, without limitation, propagation resistivity tools, induction tools, nuclear magnetic resonance (NMR) tools, acoustic tools, and nuclear density porosity tools. First and second components are used because the components may be used interchangeably. For example, the portion of an induction tool containing the antennas (the first portion) may be used with various outer sleeves (the second portion). Each portion has an offset calibration individually attributable to that portion. For ease of discussion, the embodiments discussed below are directed to propagation resistivity tools, but the invention is not limited to those particular embodiments or that particular tool.

Figure 1:
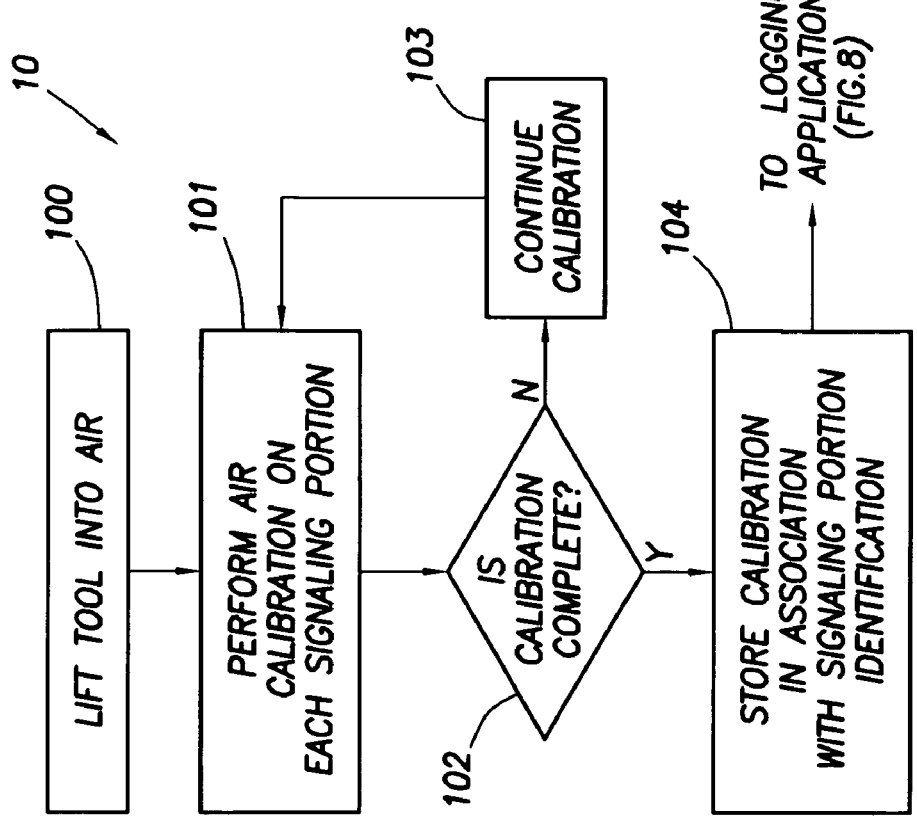
FIG. 1 shows one embodiment of a signaling portion calibration method.

FIG. 1 shows one embodiment 10 of a propagation resistivity tool calibration method. Step 100 separates a signaling portion of the tool from surrounding unpredictable influences. This is performed, for example, by lifting the signaling portion high in the air so that it is far enough away from any conductive material to substantially prevent such material's influence on the readings. Assuming air calibration, step 101 performs calibration on each individual signaling portion. For each signaling portion, the tool makes phase shift and attenuation measurements in a well-known manner. For example, with respect to FIG. 3 and as will be discussed in more detail herein, transmitters 31, 32 send out signals (not necessarily at the same time) and receivers 33, 34 measure the voltage and phase of the signals returned from the transmission. The system, for example system 80 of FIG. 8, calculates the ratio of the amplitudes and the difference in phase of the voltages measured by the two receivers, thereby determining an offset from the "ideal" condition. Because the calibration is done in isolation, this offset is attributed to the physical structure of the signaling portion.

Note the phase shifts and attenuations in this example are the borehole compensated phase shift and attenuations, not the raw ones. The borehole compensated phase shift (attenuation) is the average of the phase shift (attenuation) from two transmitters positioned on either side of a pair of receivers. The borehole compensation eliminates any variation caused by electronic difference or drift. However, the method of this invention is equally applicable to raw measurements of, for example, amplitude and phase, not just borehole compensated measurements.

Another method for performing this offset calibration uses what is called a "two-height calibration" in which the sending portion is placed at a certain first height from the ground, a measurement is made, and then the sending portion is moved to a different height and the measurement repeated. Knowing the difference in the two heights from the ground and the measurements made at each height, the system can calculate the conductivity of the ground and correct for it, as is well known in the art, thereby generating the calibration offset. The calculation involved has been used on induction tools and is well known, but the method of offset calibration as claimed herein is distinguishable over that known manner of calculation. Steps 102 and 103 insure that the calibration is complete, and step 104 stores the calculations, for example in database 82 (shown in FIG. 8).

Figure 2:
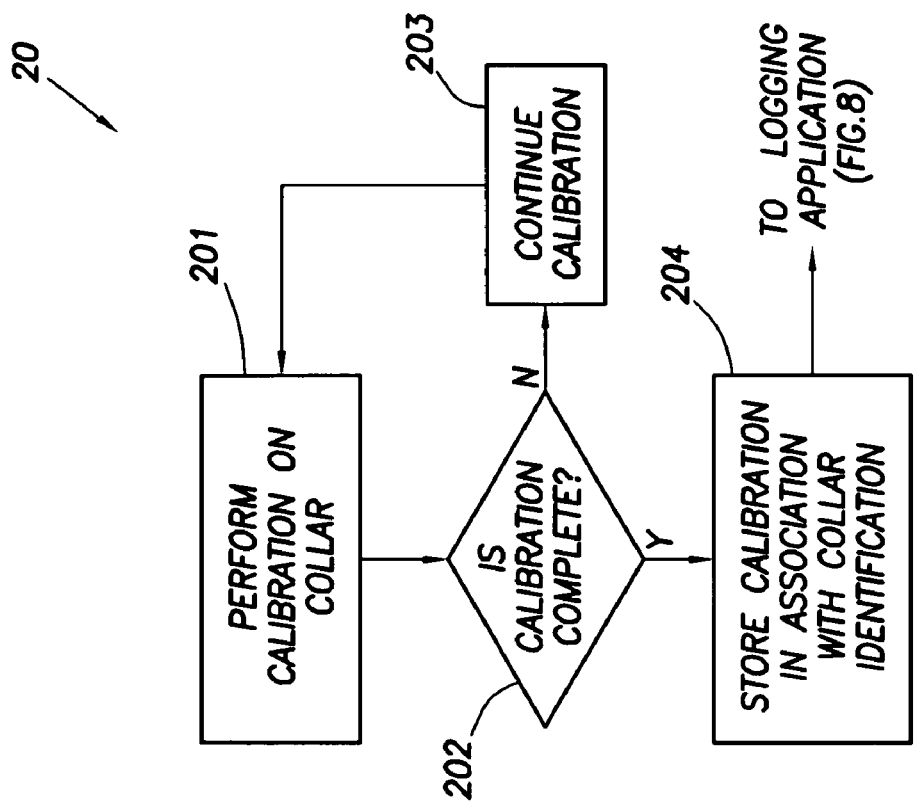
FIG. 2 shows one embodiment of a drill collar calibration method.

FIG. 2 shows an embodiment 20 of a drill collar calibration method. Recall the terms "drill collar" and "collar" are used to include tubulars, housings, sleeves, shields, or other such "second portions" into which a "first portion" may be disposed. In this embodiment, step 201 inserts a calibrated signaling portion inside a drill collar and performs an air calibration (as discussed above) on the combination. The difference in measurements between the signaling portion by itself and the combined signaling portion and drill collar yields the drill collar offset calibration. If desired, the drill collar can be tested with different calibrated signaling portions to determine a more accurate drill collar offset calibration. Steps 202 and 203 operate to insure that the calibration is complete and process 204 stores the drill collar offset, for example in database 82.

Figure 3:
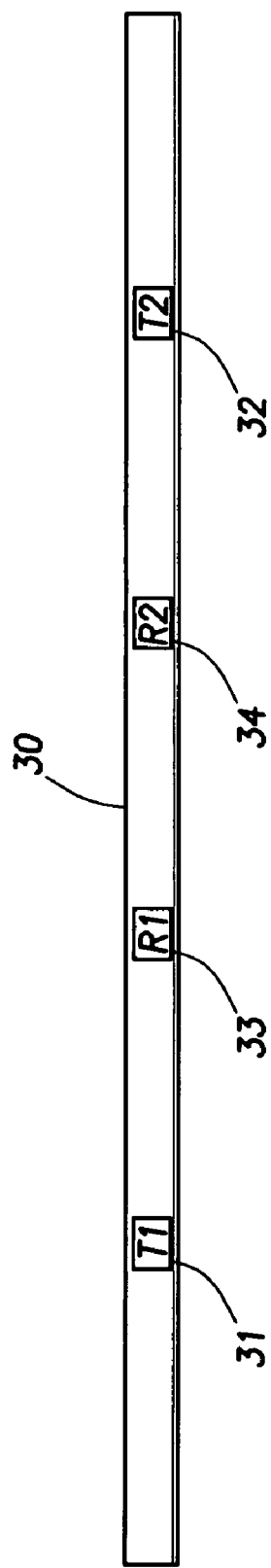
FIG. 3 shows one embodiment of a signaling portion.

FIG. 3 shows one embodiment of a signaling portion 30, having transmitters 31, 32 and receivers 33, 34. Note that while the transmitters 31, 32 and receivers 33, 34 are shown as boxes, they are typically constructed by wire wrapped around or otherwise disposed on a mandrel, forming antennas for transmission and reception. All signaling portions, even signaling portions of similar size, behave slightly different from one another. Thus, in most situations, each signaling portion will have its own offset calibration value. As discussed, these offset calibrations are stored in a database along with the identification of the signaling portions to which each offset is associated. While a tool typically has two transmitters and two receivers, it can have any number of transmitters and receivers. The transmitters can transmit at different times or at different frequencies from each other and these differences are detected by receivers 33, 34.

Figure 4:
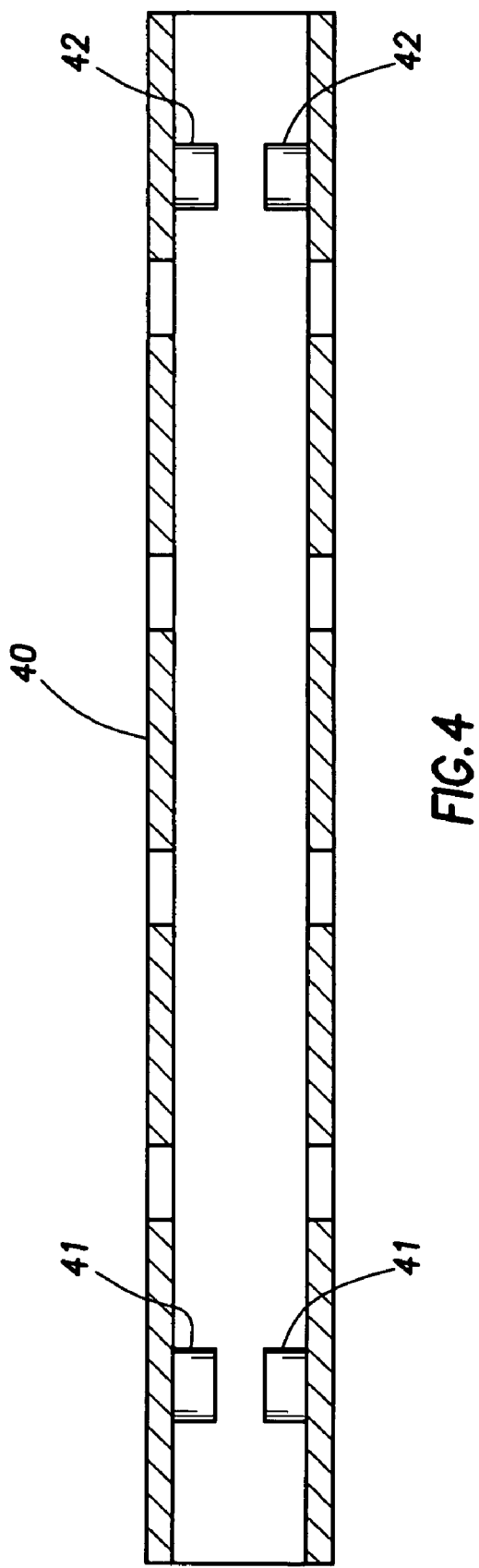
FIGS. 4 and 5 show embodiments of drill collars.

FIG. 4 shows an embodiment of a drill collar 40, having two grounding paths 41 and 42 to contain the cross-talk at either end of the signaling portion, as will be discussed hereinafter.

Figure 5:
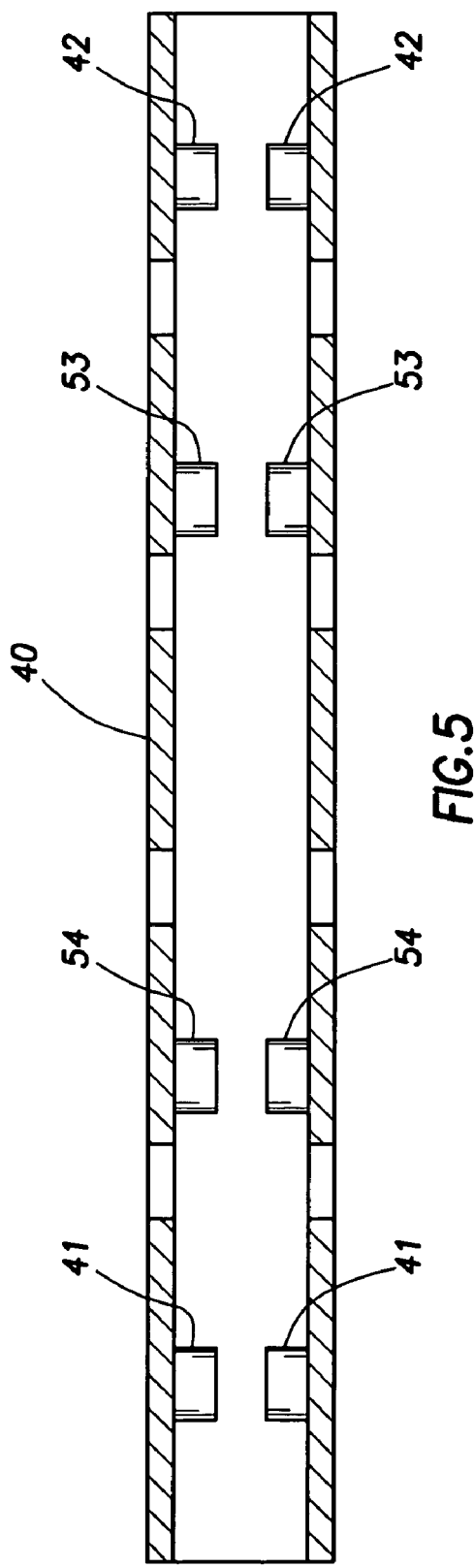

FIG. 5 shows another embodiment of a drill collar 40, having four grounding paths 41, 42, 53 and 54 to further contain the cross-talk, as will be discussed hereinafter.

Figure 6:
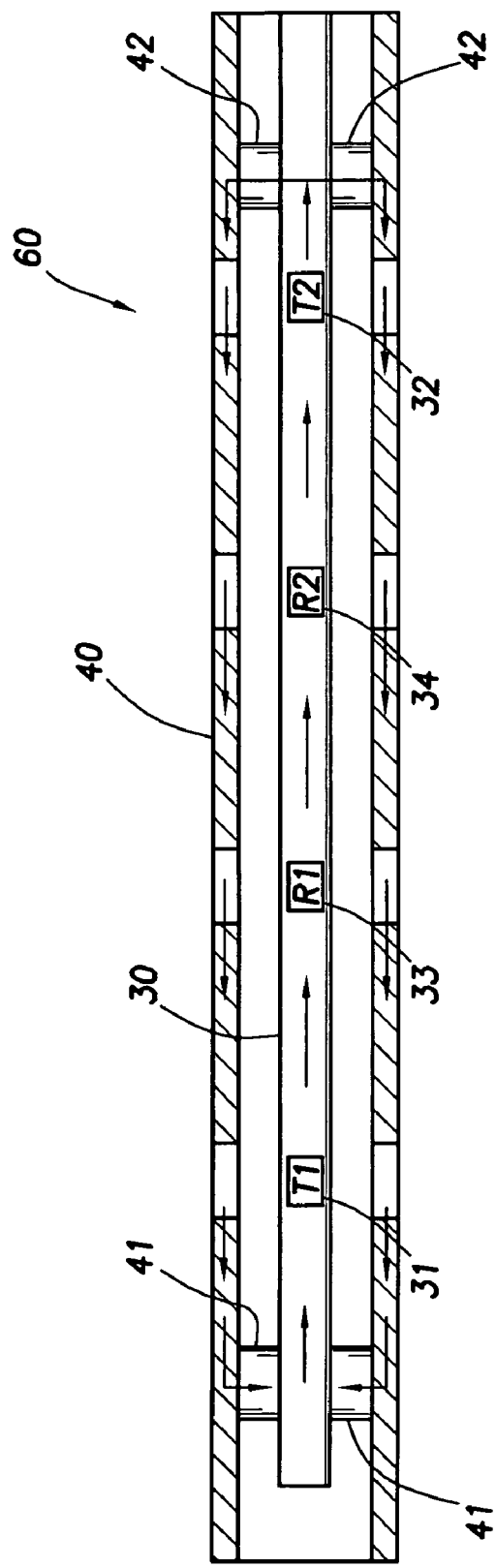
FIGS. 6 and 7 show embodiments of a signaling portion positioned within different collars.
Figure 8:
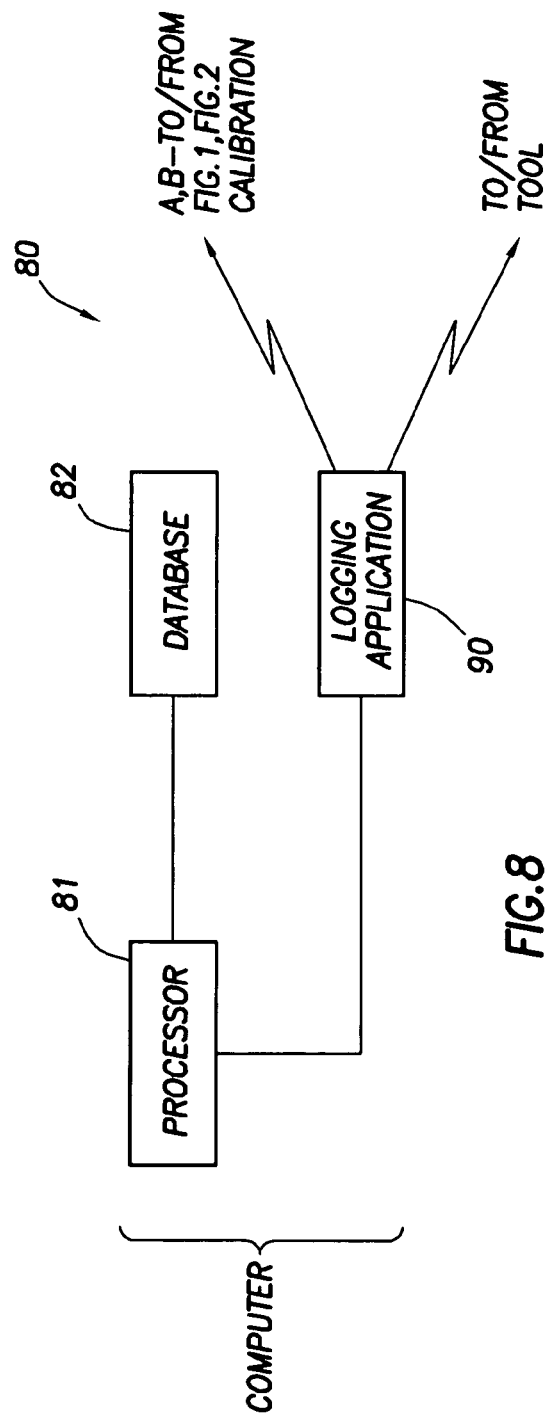
FIG. 8 shows one embodiment of a system running a logging sequence.

FIG. 6 shows an embodiment 60 of signaling portion 30 positioned within drill collar 40. Signaling portion 30 has a calibration offset contained in a database, such as database 82 (FIG. 8). Drill collar 40 also has an offset associated therewith, also stored in database 82. Note that the offset associated with drill collar 40 can be an actual measured offset of that particular drill collar, or an offset based on a category of drill collars. This category can be based on size, length, slot design for signal passage, composition of the drill collar, or a combination of those factors. Another effect that can affect the measurement is the conductivity of drilling fluid that has penetrated into the tool between the signaling portion and the inside wall of the drill collar. This effect can be modeled as a function of drill collar size and stored as a lookup table that can then be used to correct the measurements.

Ground paths 41, 42 of drill collar 40 contact or come into close proximity to signaling portion 30, causing at least a portion of the current path from the RF transmitters to follow the cross-talk path indicated by the arrows. Desired cross-talk should be less than −60 dB and ideally in the −90 dB range. There are actually two main types of coupling that must be contained. One type of coupling, called TE coupling, is current passing along the drill collar between the transmitter and receiver. The other type of coupling is called TM coupling and occurs when a parasitic current is driven down the signaling portion and then back up through the drill collar. This type of coupling (TM) behaves like a coaxial cable. Both types of coupling must be controlled so that the received signal is combinable. The TE coupling is controlled by choice of spacings between transmitters and receivers, and the TM coupling is controlled by design of the ground paths (such as paths 41, 42) that redirect these currents.

The signaling portion and drill collar combination must be designed so that the antenna spacings are such that signals that propagate inside the drill collar die off before they reach the receivers. This is fundamentally a "wave guide beyond cut off" situation and a calculation can be made as to how far a signal will propagate before it drops by a certain dB level inside a drill collar having a particular geometry.

The offset calibration for the combination shown in FIG. 6 is the pre-calculated offset of signaling portion 30 as determined, for example, by process 10, and the pre-calculated offset of drill collar 40 as determined, for example, by process 20. Note that the offset for drill collar 40 could be an offset for a similar category of drill collar.

Figure 7:
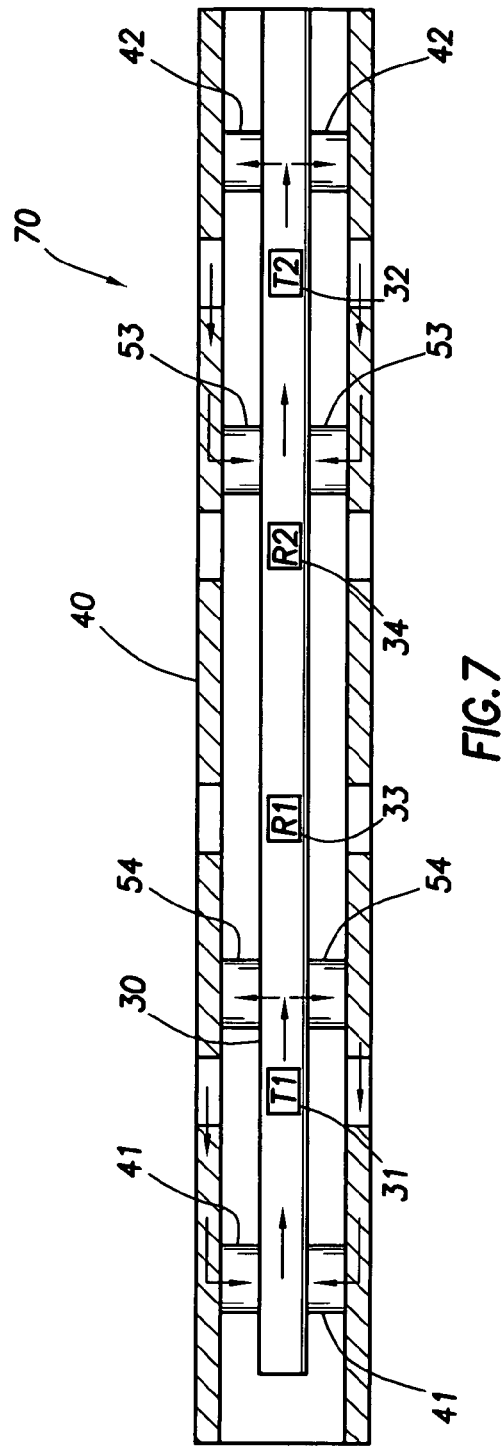

FIG. 7 shows an embodiment 70 of a signaling portion 30 positioned in a drill collar 40. The total offset for the combination shown in FIG. 7 is the offset of signaling portion 30 plus the offset for drill collar 40 (or the offset for drill collar category 40). Note that while the same signaling portion 30 may be used with two different drill collars, any number of different signaling portions can be used in conjunction with any number of different drill collars. Thus, for each logging session or sequence of logging runs, a different signaling portion can be mated with a given drill collar. This could occur, for example, when a particular drill collar is positioned downhole and a signaling portion malfunctions. In such a situation, the "bad" signaling portion can be removed and a different signaling portion (with a different calibration offset) can be inserted. The calibration process, for example application 90, then would calculate a new combined calibration offset. This then allows signaling portions to be moved from location to location and not remain fixed to or associated with a particular drill collar.

FIG. 8 shows one embodiment 80 of a calibration system having processor 81 with database 82 controlled, for example, by logging program 90.

FIG. 9 shows one embodiment of a portion of program 90 for controlling the calibration measurements. Step 901 accepts the identification of the particular signaling portion desired for a particular test. The identification of the drill collar into which the signaling portion is (or will be) inserted is also accepted by step 902. If step 903 determines that one or more of the offsets are not available, the proper error message is sent by step 904.

If the offsets are in the database, step 905 obtains the offsets and step 906 combines the offsets to calculate the total offset of the selected signaling portion/drill collar combination. These offsets can be added or otherwise combined to form a total offset for the desired combination. This combined offset is then used to perform the desired logging measurements as controlled by step 907. When steps 908 and 909 determine that the measurements are complete, step 910 reports the results and/or stores the data in the database. During the next logging sequence with this same drill collar, a different tool can be used and application 90 will adjust the overall calibration accordingly.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of calibrating a well logging tool in which the logging tool has any one of a number of different first portions operating in mated relationship with any one of a number of different second portions, the method comprising:
    determining an individual calibration offset for each of the first portions;
    determining a calibration offset for each of the second portions; and
    establishing on a session-by-session basis a total calibration offset for a combination of a particular first portion mated with a particular second portion.

2. The method of claim 1 wherein the logging tool is selected from the group consisting of propagation resistivity tools, induction tools, nuclear magnetic resonance tools, acoustic tools, and nuclear density porosity tools.

3. The method of claim 1 wherein the establishing comprises combining a pre-determined individual calibration offset for the particular first portion with a pre-determined calibration offset for the mated second portion.

4. The method of claim 3 wherein the pre-determined offset for the second portion is an offset pertaining to a category of second portions.

5. A method of calibrating a resistivity tool in which the resistivity tool has any one of a number of different signaling portions operating in mated relationship with any one of a number of different drill collars, the method comprising:
    determining an individual calibration offset for each of the signaling portions;
    determining a calibration offset for each of the drill collars; and
    establishing on a session-by-session basis a total calibration offset for a combination of a particular signaling portion mated with a particular drill collar.

6. The method of claim 5 wherein the establishing comprises combining a pre-determined individual calibration offset for the particular signaling portion with a pre-determined calibration offset for the mated drill collar.

7. The method of claim 6 wherein the pre-determined offset for the drill collar is an offset pertaining to a category of drill collars.

8. A method of performing downhole logging in which the logging equipment has any one of a number of different first portions operating in mated relationship from time to time with any one of a number of different second portions, the method comprising:
    selecting a desired one of the first portions and a desired one of the second portions;
    establishing a calibration offset for the selected first and second portions by combining pre-determined calibration offsets of the selected first and second portions;
    mating the selected first portion and second portion; and using the mated first portion and second portion with the established calibration offset to perform the downhole logging.

9. The method of claim 8 wherein the mating is accomplished by disposing the first portion within the second portion.

10. The method of claim 8 wherein the pre-established calibration offset of the second portion is a calibration offset of a category of second portions having pre-determined similar characteristics.

11. The method of claim 10 wherein the categories of second portions are based on size, length, slot design, or composition of the second portion, or a combination thereof.

12. The method of claim 10 wherein the second portions of a particular category are designed to minimize the differences between individual second portions in that category.

13. The method of claim 8 wherein the combining pre-determined calibration offsets is accomplished by placing the identities of the selected first portion and second portion into a computer program such that the computer program performs a calibration calculation based upon prestored data pertaining to the selected first portion and second portion.

14. The method of claim 13 wherein the identities can be selected from a list of specific identities of first portions and second portions, one or more physical characteristics of the first portions and second portions, one or more operating characteristics of the first portions and second portions, or any combination thereof.

15. A system for determining a calibration of a downhole logging tool in which the logging tool has any one of a number of different first portions operating from time to time in mated relationship with any one of a number of different second portions, the system comprising:
an application program for controlling the storage in a storage medium of offset calibration data pertaining to individual ones of the first portions;
the application program further operable for controlling the storage on a storage medium of offset calibration data pertaining to individual ones or a group of the second portions; and
the application program further operable for accepting from a user an identity of a particular first portion and a particular second portion and for thereupon calculating a combined offset for facilitating measurement using the particular first portion mated with the particular second portion.

16. The system of claim 15 wherein the logging tool is selected from the group consisting of propagation resistivity tools, induction tools, nuclear magnetic resonance tools, acoustic tools, and nuclear density porosity tools.

17. The system of claim 15 wherein the logging tool is a propagation resistivity tool and the first portion is a signaling portion having a longitudinal axis and transmitters and receivers spaced apart along the longitudinal axis.

18. The system of claim 17 wherein the second portion is a drill collar comprising a hollow elongated tube adapted to receive the signaling portion.

19. The system of claim 18 wherein the drill collar further comprises a plurality of spaced apart ground paths.

20. The system of claim 19 wherein the ground paths comprise current carrying material, at least a portion of which is in close proximity to the signaling portion when the signaling portion is in mated relationship with the drill collar.

21. A downhole logging system comprising:
a plurality of first portions, each first portion having transmitters, receivers, and a pre-determined calibration offset associated therewith;
a plurality of second portions, each second portion being adapted for mating relationship with any one of the first portions, each second portion being assigned to a second portion category according to at least one of the second portion's physical characteristics, each second portion category having a pre-determined calibration offset associated therewith; and
means for calculating a combined calibration offset when a particular first portion is mated with a particular second portion for a particular logging sequence.

22. The system of claim 21 wherein the calculating means utilizes the pre-determined calibration offsets to determine the combined calibration offset.

23. The system of claim 21 wherein the second portion further comprises a plurality of spaced apart ground paths.

24. The system of claim 23 wherein the ground paths comprise current carrying material, at least a portion of which is in close proximity to the first portion when the first portion is in mated relationship with the second portion.

25. The system of claim 21 wherein the second portion category calibration offset accounts for the effect of drilling fluid between the first portion and the second portion.

* * * * *